April 26, 1927.

M. J. CALLAHAN

RADIATOR FOR HEATING AND VENTILATING UNITS

Filed Sept. 4, 1925

1,626,390

INVENTOR:
Michael J. Callahan
BY Chas. M. C. Chapman
ATTORNEY.

Patented Apr. 26, 1927.

1,626,390

UNITED STATES PATENT OFFICE.

MICHAEL J. CALLAHAN, OF NEW YORK, N. Y.

RADIATOR FOR HEATING AND VENTILATING UNITS.

Application filed September 4, 1925. Serial No. 54,579.

This invention relates to the art of heating and ventilating, and particularly has reference to radiators or heating elements for heating and ventilating apparatus of the "unit" type.

It is well known that the heating and ventilating unit has revolutionized the heating and ventilating art, because of its peculiar adaptability for heating and ventilating school-rooms, hospitals and other spaces in which it is a great desideratum, if not an absolute essential, that the temperature shall be maintained at a uniform and predetermined degree. An essential part of the unit is the heating element, since it must be so constructed as to give a maximum of heat, occupy a minimum of space and, at the same time, be made sufficiently light, strong and durable to justify its use in a heating and ventilating unit and enable it to be placed securely in desired position in the unit.

It is an object of my present invention to provide a heating element, in the form of a radiator of separable parts or units, which is capable of giving or throwing off a maximum amount of heat and occupying a minimum amount of space, and which will be strong, durable, and economical to produce. It is another object of my invention to provide a heating element constructed of sections or heating units which are interchangeable, readily replacable, which can be put together and taken apart with facility, and which can be built up indefinitely to answer the requirements of heat distribution, space and economy. It is a further object of my invention to provide a radiator or heating element of the type indicated in the foregoing which can be crated and transported with facility, can be readily put together by ordinary mechanics, and with equal facility can be knocked down, or added to, or reduced in size as occasion may require.

With the foregoing objects in view and others which will be detailed during the course of this description, my invention consists in the parts, features, elements and combinations thereof hereinafter described and claimed.

In order that my invention may be clearly understood, I have provided drawings wherein.

Figure 1:
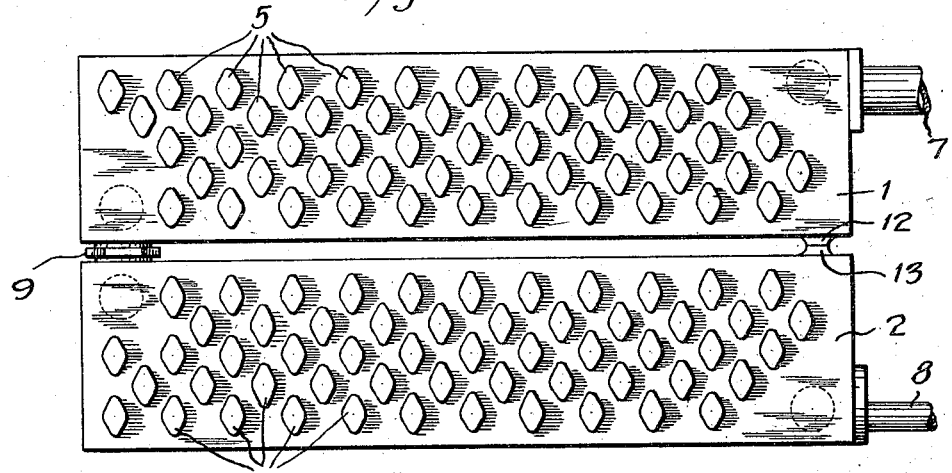
Figure 1 is a view showing in side elevation a heating element or radiator embodying my invention, composed of two tiers of units, the tiers being composed of three units each.
Figure 2:
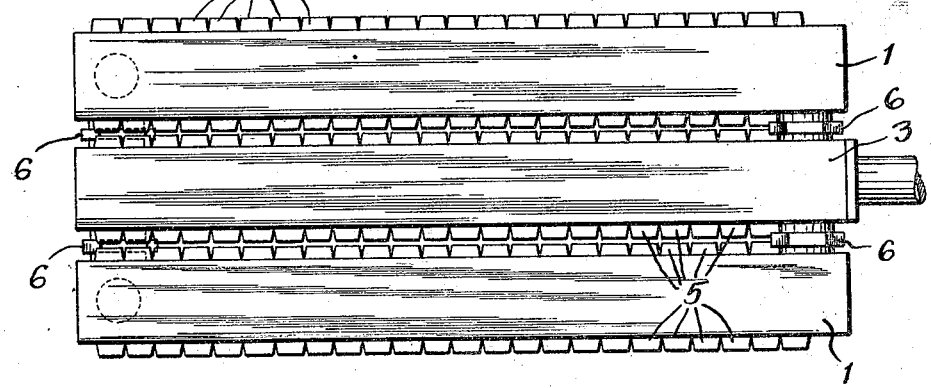
Figure 2 is a top plan view of the structure shown in Figure 1.
Figure 3:
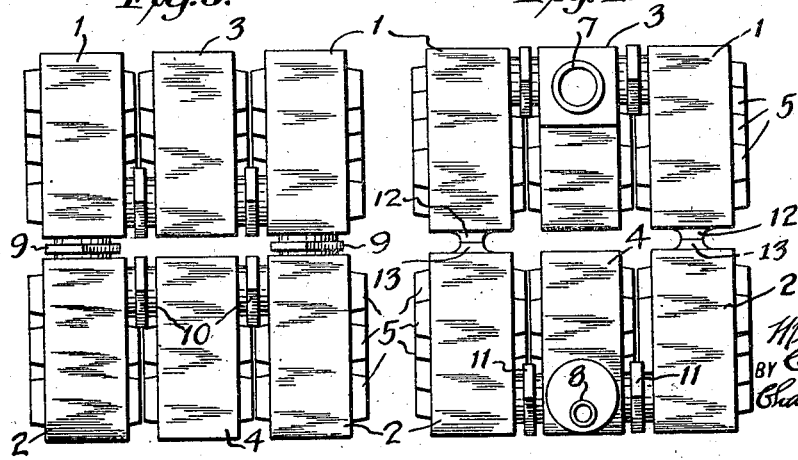
Figure 3 is a view showing an end elevation looking at Figures 1 and 2 from the left.
Figure 4:
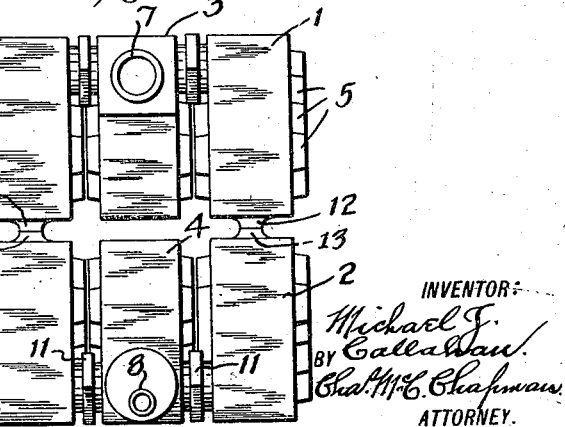
Figure 4 is a view showing an end elevation looking at Figures 1 and 2 from the right.

I have shown in the drawings only six units in two tiers in order to illustrate my invention, because such a radiator lends itself readily for use in my heating and ventilating units of the type shown in my application Serial Number 15,518, filed March 14, 1925, and which I have designated as "lowdown unit". I desire it understood, however, that, according to the character of the unit casing employed by me for a given or predetermined installation, the radiator can be increased or decreased in size by the addition or subtraction of radiator units or elements. Consequently, I wish it understood that, while I have shown a radiator composed of six elements or units arranged in two tiers of equal number, I am not to be restricted to such structure or arrangement of radiator elements.

Referring to the drawings, the numeral 1 indicates the outside radiator units or elements at the top of the group, and the numeral 2 indicates the outside radiator units or elements at the bottom of the group. The numeral 3 indicates the middle radiator unit at the top of the group, and the numeral 4 indicates the middle radiator unit at the bottom of the group. Each of the radiator units is tubular and is provided on its opposite sides with elongated, equidistantly disposed, radiating teats 5, the major axis of which extends transversely of the length of the units and the minor axis of which extends longitudinally of the units.

The units are grouped, as shown in the drawings, in two tiers of three units each, and are held in grouped relation by couplings, the structure of which need not be described, but which are indicated generally at 6; that is to say, the form of the couplings is no part of my invention, it being obvious that any suitable form of coupling may be employed which is generally indicated at 6, provided they enable the radiator elements, sections or units to be readily joined together or separated. The disposition of the couplings and the mode of grouping the radiator units, however, are parts of my invention. The middle top unit 3 of my radiator is the inlet member of the group and to it, at one end, is coupled the fluid inlet pipe 7. The middle lower unit 4 of my radiator is the return member of the group and to it, at one end, is coupled the return pipe 8. The inlet pipe 7, coupled to the radiator unit 3, is arranged at the top of the latter, while the return or outlet pipe for the condensation or return fluid is coupled to the bottom of the unit 4 of the group. The top units 1 and 3 of the group are coupled together at their inner sides and near their right end at the top, the couplings being the lateral distributors for the heating fluid as it passes from the middle unit. The outer top units 1 of the group are also coupled to the middle unit 3 at the opposite end and at the bottom thereof by the lateral couplings 6 for lateral distribution from the central unit 3 to the outer units 1, and for lateral distribution from one to the other of the top units of the group. The said outer units 1 are also joined at their bottom by couplings 9 to the top of the outer lower units 2 of the group. Thus, the fluid is distributed from the top outer units 1 to the lower outer units 2 at the top thereof. The lower outer units 2 are joined at one side near the top to the sides near the top of the lower middle unit 4 by couplings 10, this enabling lateral distribution of the fluid among the lower units 2 and 4, which units are also joined at their bottom to each other by couplings 11, enabling lateral distribution of the fluid at the return end of the lower units. Thus, free and complete distribution of the fluid entering at the inlet pipe 7 is provided for, not only laterally at the top of all the units, and longitudinally thereof, but also laterally of all the units at the bottom thereof.

The couplings 9 between the top and bottom outer units of the group have the additional function of supporting the upper outer units 1 from the lower outer units 2, at one end of the group, so as to hold the units in proper relation. To provide for a similar support at the opposite end of the group, the upper outer units 1 are provided on their bottom with a cast lug 12, which cooperates with a cast lug 13 on the top of the lower outer units 2. The inner top unit 3 does not require any lugs to support it upon the lower inner unit 4, because said middle top unit is coupled to the two outer units 1 at the inlet end. However, such support may be provided if desired. The supporting lugs 12 and 13 may be cast integral with the respective units 1 and 2, or may be a single lug cast integral with one of the units, or may be an independent device of proper dimensions to be inserted between the several units, as will be readily understood.

It will now be readily seen that I have provided a radiator consisting of like, reversible and interchangeable units, elements or members where the latter have like characteristics; that is to say, the inlet and outlet units 3 and 4 are interchangeable with each other, it being only necessary to provide the proper coupling for the inlet and outlet pipes 7 and 8, while the outer units 1 and 2 are interchangeable and reversible. It will also be seen that I have provided a symmetrical, well balanced, light, strong and durable radiator, the units or elements of which can be replaced in case of breakage, defects, or any trouble; and the elements of which radiator are of such nature as to enable them to be grouped in any required manner and in any number desired for the purposes of the radiator. It will be understood, however, that my radiator, while specially adapted for heating and ventilating units, can be utilized in the open; that is to say, in the usual manner of any other radiator, and this with great facility and better effects because of the heat distribution characteristics thereof.

The disposition of the teats 5, relative to the radiator units, or transversely of the latter, as previously described, provides for driving the air with facility at a right-angle to the length of the radiator.

Having thus described my invention, what I claim and desire to secure by Letters Patent is:

1. A radiator comprising a plurality of tubular units grouped in tiers horizontally, one tier being arranged above another; tubular coupling means for the units, certain of the coupling means also acting to support units one on the other; fluid inlet means coupled to the central unit of one tier; and fluid outlet means coupled to the central unit of the other tier.

2. A radiator comprising a plurality of tubular, rectangular units of uniform size from end-to-end grouped in tiers horizontally, one tier being arranged above another; tubular coupling means for the units, certain of the coupling means also acting to support units one on the other; and the other coupling means extending laterally between the units; fluid inlet means coupled to one of the units at its extreme end; and fluid outlet means coupled to another of the units at its extreme end.

MICHAEL J. CALLAHAN.